United States Patent
Brinnand et al.

(12)
(10) Patent No.: US 6,430,616 B1
(45) Date of Patent: Aug. 6, 2002

(54) SCALABLE SYSTEM METHOD FOR EFFICIENTLY LOGGING MANAGEMENT INFORMATION ASSOCIATED WITH A NETWORK

(75) Inventors: John Brinnand, Sunnyvale; Rajeev Angal, Santa Clara, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/206,095

(22) Filed: Dec. 4, 1998

(51) Int. Cl.[7] .............................................. G06F 13/00
(52) U.S. Cl. ........................ 709/224; 709/107; 709/203
(58) Field of Search ................................. 709/102, 104, 709/107, 202, 203, 223, 224, 226, 250

(56) References Cited

U.S. PATENT DOCUMENTS

| | | | | |
|---|---|---|---|---|
| 5,796,633 A | * | 8/1998 | Burgess et al. | 702/187 |
| 5,857,190 A | * | 1/1999 | Brown | 707/10 |
| 5,881,315 A | * | 3/1999 | Cohen | 710/52 |
| 6,073,172 A | * | 6/2000 | Frailong et al. | 709/222 |

* cited by examiner

*Primary Examiner*—Viet D. Vu
(74) *Attorney, Agent, or Firm*—Bromberg & Sunstein LLP

(57) ABSTRACT

A network management information logging system for use in connection with logging management information for a network includes a repository, at least one work queue, a plurality of logging components and a log server main component. The repository configured to store management information for the network. The "at least one" work queue receives logging requests to be processed. Each of the plurality of logging components retrieves logging requests from the work queue, processes the retrieved logging requests in connection with logging information in the repository, and to generate logging responses responsive thereto. The log server main component receives logging requests from the network and loads them into the work queue for retrieval and processing by the logging components. In addition, the log server main component receives the logging responses from the logging components and transfers them to the network. In one embodiment, the logging coponents and the log server main component are both in the form of threads.

24 Claims, 2 Drawing Sheets

SCALABLE SYSTEM METHOD FOR EFFICIENTLY LOGGING MANAGEMENT INFORMATION ASSOCIATED WITH A NETWORK

FIELD OF THE INVENTION

The invention relates generally to the field of digital data networks, and more particularly to systems and methods for logging management information, relating to, for example, events which occur in a network.

BACKGROUND OF THE INVENTION

In modern "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations (generally, "computers") are used by individual users to perform processing in connection with data and programs that may be stored in the network mass storage subsystems. In such an arrangement, the computers, operating as clients, access the data and programs from the network mass storage subsystems for processing. In addition, the computers will enable processed data to be transferred to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the computers the network. Such a network may be relatively localized, in which case the network is often referred to as a "local area network." Alternatively, a network may be spread over a fairly wide area, either as a collection of local area networks or otherwise, in which case the network is often referred to as a wide area network.

As networks become larger, that is, as more computers and other devices are connected into networks, a problem arises in that the rate at which management information, particularly relating to various events which occur in the network, will generally increase. Events, information for which may need to be logged, includes information which can help diagnose causes of failures and other malfunctions in connection with computers and other devices connected in the network, as well as problems that can develop in connection with transfer of message packets among the computers and other devices in the network. The information to be logged may also include information as to errors in connection with transfer of message packets among the computers and other devices connected in the network, such as if the congestion in message packet transfer exceeds a predetermined threshold for a selected period of time, if message packets are lost, or if the bit error rate in connection with transfer of message packets to and/or from particular locations in the network exceeds a predetermined threshold. The information relating to errors in connection with message packet transfer can be useful, not only in diagnosing errors and other malfunctions, but also in connection with determining if additional message transfer bandwidth should be added to the network. The information to be logged may also include information as to utilization of various components of the computers or other devices which are connected in the network, which may be useful in determining whether additional components or such devices should be added or they should be re-allocated among users in the network. For example, if the data stored in respective computers' disk storage devices or memories exceed a predetermined percentage of the total capacity for a selected period of time, a system administrator may determine that the capacity should be increased. Similarly, if a network printer's queue of print jobs exceeds a predetermined threshold for too long a time, system administrator may determine that another printer should be added. Other types of management information which may be logged, and the use to which it may be put, will be apparent to those skilled in the art. It will be appreciated that, as the number of computers and other devices connected in the network increases, the rate at which such management information is generated will also increase.

SUMMARY OF THE INVENTION

The invention provides a new and improved system and method, for use in connection with a digital network, for facilitating the efficient logging of management information, including, for example, information regarding events which occur in the network.

In brief summary, a network management information logging system for use in connection with logging management information for a network includes a repository, at least one work queue, a plurality of logging components and a log server main component. The repository configured to store management information for the network. The "at least one" work queue receives logging requests to be processed. Each of the plurality of logging components retrieves logging requests from the work queue, processes the retrieved logging requests in connection with logging information in the repository, and to generate logging responses responsive thereto. The log server main component receives logging requests from the network and loads them into the work queue for retrieval and processing by the logging components. In addition, the log server main component receives the logging responses from the logging components and transfers them to the network. In one embodiment, the logging coponents and the log server main component are both in the form of threads.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
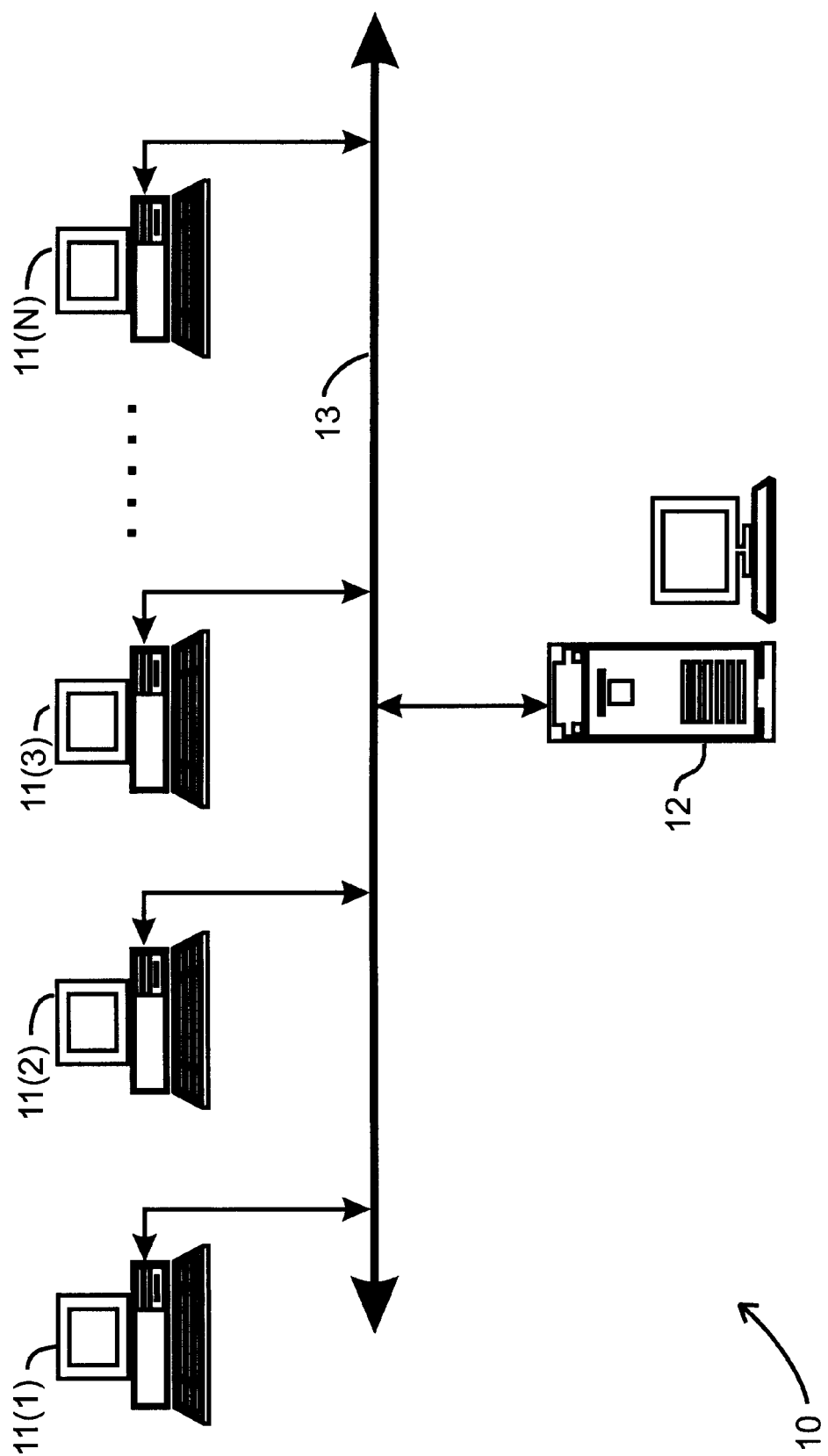
FIG. 1 is a schematic diagram of a computer network including a network management information logging system for logging management information relating to various aspects of operations of the network, constructed in accordance with the invention.

FIG. 1 depicts a computer network 10 including a network management information logging system facilitating the efficient logging of management information, including, for example, of various aspects of operations in connection with the network 10, constructed in accordance with the invention. With reference to FIG. 1, network 10 includes a plurality of computers 11(1) through 11(N) (generally identified by reference numeral 11(n)) and 12 which are interconnected by a communication link 13. As is conventional, the computers 11(n) and 12 are of the conventional stored-program computer architecture. At least some of the computers 11(n) are in the form of personal computers or computer workstations, each of which includes a system unit, a video display unit and operator input devices such as a keyboard and mouse. The computer 12 also includes a system unit, and may also include a video display unit and operator input devices. A system unit generally includes processing, memory, mass storage devices such as disk and/or tape storage elements and other elements (not separately shown), including network interface elements for interfacing the respective computer system 11(n) or server computer 12 to the communication link 13. A video display unit permits the computer to display processed data and processing status to the user, and an operator input device enable the user to input data and control processing by the computer. The computers 11(n) and 12 transfer information, in the form of messages, through their respective network interface devices among each other over the communication link 13. The communication link 13 interconnecting the client computers 11(n) and server computer 12 in the network 10 may, as is conventional, comprise wires, optical fibers or other media for carrying signals representing information among the computers 11(n) and 12.

In one embodiment, the network 10 is organized in a "client-server" configuration, in which at least one computer, namely, computer 12, operates as a server, and the other computers 11(n) operate as clients. Typically, the servers include large-capacity mass storage devices which can store copies of programs and data which are available for retrieval by the client computers over the communication link 13 for use in their processing operations. From time to time, a client computer system 11(n) may also store data on the server computer 12, which may be later retrieved by it (the client computer that stored the data) or other client computers for use in their processing operations.

The server computers may be generally similar to the client computers 11(n), including a system unit, video display unit and operator input devices and may be usable by an operator for data processing operations in a manner similar to a client computer. Alternatively, at least some of the server computers may include only processing, memory, mass storage and network interface elements for receiving and processing retrieval or storage requests from the client computers, and generating responses thereto.

Although not shown in FIG. 1, the network 10 may also include numerous other types of devices, including, for example, routers and gateways for facilitating the transfer of information with computers and other devices connected in other networks, network printers for generating hardcopy output, modems for connecting the network the public telephony system, and other devices which will be apparent to those skilled in the art.

The invention provides an arrangement, which will be termed a network management information logging system, identified by reference numeral 20, for efficiently logging management information, including information regarding occurrence of events, in the network 10, as the size of the network 10, that is, the number of computers and other devices, increases. The information logged by the network management information logging system 20 typically includes a variety of types of information which a system administrator may wish to have access to in order to assist in diagnosing causes of failures and other malfunctions in computers and other devices connected to the network. The information to be logged may also include information as to errors in connection with transfer of message packets among the computers and other devices connected in the network, such as if the congestion in message packet transfer exceeds a predetermined threshold for a selected period of time, if message packets are lost, or if the bit error rate in connection with transfer of message packets to and/or from particular locations in the network exceeds a predetermined threshold. The information relating to errors in connection with message packet transfer can be useful, not only in diagnosing errors and other malfunctions, but also in connection with determining if additional message transfer bandwidth should be added to the network. The information to be logged may also include information as to utilization of various elements of the computers 11(n) or 12 or devices which are connected in the network, which may be useful in determining whether additional elements or such devices should be added or they should be re-allocated among users in the network. For example, if the data stored in respective computers' disk storage devices or memories exceed a predetermined percentage of the total capacity for a selected period of time, a system administrator may determine that the capacity should be increased. Similarly, if a network printer's queue of print jobs exceeds a predetermined threshold for too long a time, system administrator may determine that another printer should be added. Other types of management information which may be logged, and the use to which it may be put, will be apparent to those skilled in the art.

Figure 2:
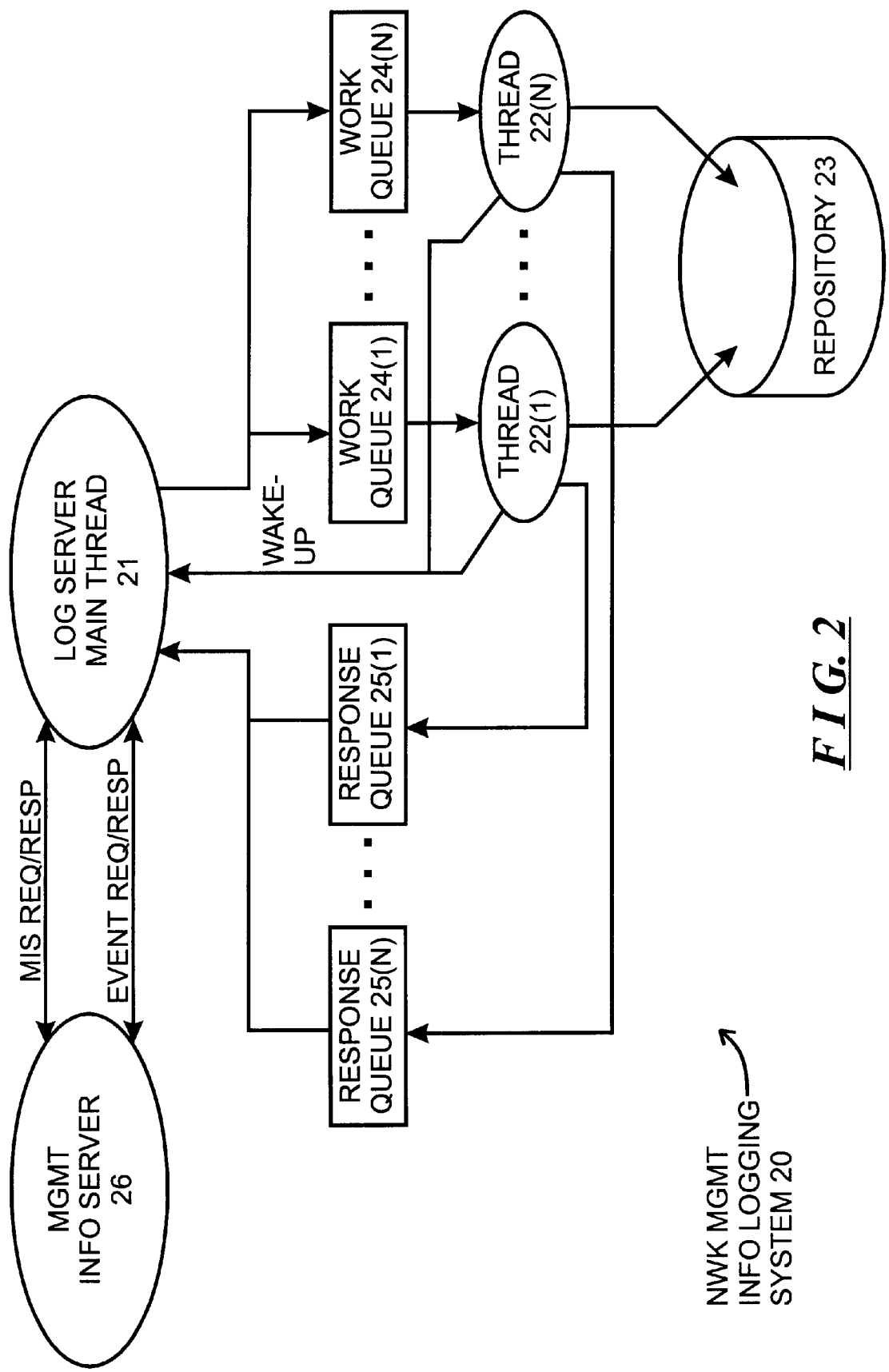
FIG. 2 is a functional block diagram of a network management information logging system useful in the computer network depicted in FIG. 1.

FIG. 2 depicts a functional block diagram of the network management information logging system 20. With reference to FIG. 2, the network management information logging system 20 includes a log server main thread 21, one or more logging threads 22(1) through 22(N) (generally identified by reference numeral 22(n), and a persistent data repository 23. Each logging thread 22(n), in turn, is associated with a work queue 24(n) and a response queue 25(n). The log server main thread 21 receives logging requests from a management information server 26, which, under control of a system administrator, operates to initiate management operations in connection with the network 10 and provides status, error and other reports to the system administrator. The information stored by the management information server 26 is stored in the persistent repository 23. The log server main thread 21 parcels out the logging requests which it receives from the management information server 26 to the various logging threads 21 (n), by inserting each logging requests to a the respective logging thread's work queue 24(n). Each logging thread 22(n) retrieves successive logging requests from its respective work queue 24(n), and, for each logging request, performs the operations specified in the logging request in the repository 23. In addition, the logging thread 22(n) may also generate, in response to a logging request, a logging response, which it (that is, the logging thread 22(n)) will load in its associated response queue 25(n), the log server main thread 21, in turn, retrieves the logging responses from the response queues and provides them to the management information server 26.

Generally, the components of the network management information logging system 20 depicted in FIG. 2 may be provided by the server computer 12 and/or one or more of the computers 11(n). The components may all be provided by one computer 11(n) or 12, and they (that is, the components) may communicate using conventional inter-tread communication methodologies. Alternatively, the components may be provided by multiple ones of the computers 11(*n*) and/or 12, and they (that is, the components) may communicate using message packets transferred over the communication link 13.

As noted above, the log server main thread 21 receives logging requests from the management information server 26. In one embodiment, the management information server 26 provides two basic types of logging requests, which are generally depicted as MIS_REQ management information server requests and EVENT_REQ event requests. Generally, EVENT_REQ event requests relate to requests that are generated in response to events which occur in the network, as described above, including, for example, database storage requests to enable event information to be stored in the repository 23. On the other hand, MIS_REQ management information server requests generated by the management information server 26 relate to other types of requests, including, for example, database query requests to enable the network management information logging system 20 to perform a database query in connection with information previously stored in the repository 23. In response to EVENT_REQ event requests, the network management information logging system 20, and more specifically the log server main thread 21, generates respective EVENT_RESP event responses which indicate, for example, the success or failure of the operation to be performed in response to the respective EVENT_REQ event request. Similarly, in response to MIS_REQ management information server requests, the log server main thread 21 generates respective MIS_RESP management information server responses which generally will include the information requested in the respective MIS_REQ management information server requests.

After receiving an EVENT_REQ event request or an MIS_REQ management information server request, the log server main thread 21 will identify the appropriate logging thread 22(*n*) to process the request. Requests may be assigned to logging threads 22(*n*) based on any of a number of criteria. For example, as described above, an EVENT_REQ event request effectively enables storage of information in the repository 23 and an MIS_REQ management information server request effectively enables at least one database query to be performed to obtain information from the repository 23, and the log server main thread 21 can assign a request to a logging thread 22(*n*) based on whether the request enables storage of information in the repository 23 or obtaining of information from the repository 23. In addition, requests related to various types of events may be handled by respective ones of the logging threads 22(*n*), and the log server main thread 21 can assign a request to the from the management information server 26 to a respective logging thread 22(*n*) based on the type of event associated with the request.

After the log server main thread 21 has identified the appropriate logging thread 22(*n*) to process the request, it will determine whether the identified logging thread 22(*n*) has been started. If the log server main thread 21 determines that the identified logging thread 22(*n*) has not been started, it (that is, the log server main thread 21) can enable the identified logging thread 22(*n*) to be started, and further enable the work queue 24(*n*) and response queue 25(*n*) associated with the identified logging thread 22(*n*) to be established. If the log server main thread 21 determines that the identified logging thread 22(*n*) has been started, or after the identified logging thread 22(*n*) has been started and the work and response queues 24(*n*) and 25(*n*) have been established, the log server main thread 21 can provide the request to the work queue 24(*n*) associated with the identified logging thread 22(*n*).

Each logging thread 22(*n*), after having been started, will continually determine whether its associated work queue 24(*n*) contains any requests to be processed. If a respective logging thread 22(*n*) determines that its work queue 24(*n*) does contain a request to be processed, it will retrieve the first request in its work queue 24(*n*) and perform the operation or operations required in the request. If, for example, the request enables event information to be stored in the repository 23, the logging thread 24(*n*) can generate a database storage request for the repository 23 to enable the event information to be stored in the repository. Thereafter, the logging thread 22(*n*) will generate a status response indicating, for example, whether the storage operation succeeded or failed and store the status response in its response queue 25(*n*). In addition, if the logging thread's response queue 25(*n*) is empty when the logging thread 22(*n*) generates a WAKE_UP wake-up indication for the log server main thread 21.

On the other hand, if the request enables the logging thread 22(*n*) to perform a database query to retrieve information from the repository 23, it (that is, the logging thread 22(*n*)) will direct the database query to the repository 23 to obtain the information therefrom required in the query. After receiving the information from the repository 23, the logging thread 22(*n*) will, if necessary, format or otherwise process the information as may be specified in the request, thereby to generate a response, and load the response in its response queue 25(*n*). In addition, if the logging thread's response queue 25(*n*) is empty when the logging thread 22(*n*) generates a WAKE_UP wake-up indication for the log server main thread 21.

The log server main thread 21, in addition to receiving requests from the management information server 26 and loading them into respective work queues 24(*n*) for the appropriate logging threads 22(*n*) as described above, will retrieve responses from the respective response queues 25(*n*) for provision to the management information server 26 as the MIS_RESP management information server responses and EVENT_RESP event responses. As described above, generally, the EVENT_RESP event responses will be status responses related to requests for storing event information in the repository 23, whereas the MIS_RESP management information server responses will include information retrieved from the repository 23. The log server main thread 21 will select among the response queues 25(*n*) in any convenient order, and can retrieve responses from the respective response queues 25(*n*) until all responses have been retrieved. After the log server main thread 21 has retrieved all responses from a response queue 25(*n*), it need not thereafter attempt to retrieve responses from the response queue 25(*n*) until it receives a WAKE_UP wake-up indication from the response queue's logging thread 22(*n*), indicating that a new response has been added to its response queue 25(*n*). Thereafter, the log server main thread 21 can resume retrieving responses from the response queue 25(*n*) for provision to the management information server 26.

The network management information logging system 20 provides a number of advantages. In particular, the network management information logging system 20 provides a mechanism for storing and retrieving management information for a network in a manner that scales well as the size of the network increases.

It will be appreciated that a number of modifications can be made to the network management information logging system 20 as described above. For example, although several criteria have been described in connection with selection of a logging thread 22(n) to process a request, it will be appreciated that other criteria may be used instead of or in addition to the criteria described above. For example, logging threads 22(n) for handling EVENT_REQ event requests can be associated with respective groups of computers 11(n) or 12 or other devices which are connected in the network 10. In that case, the log server main thread 21 will determine the particular computer or device to which an EVENT_REQ event request relates and assign the request to the logging thread 22(n) associated therewith. In that connection, the logging threads 22(n) may, for example, be associated with particular ranges of the network address space. Similarly, if the network 10 is divided into sub-nets, logging threads 22(n) for handling EVENT_REQ event requests may also be associated with respective sub-nets. As noted above, the various components of the network management information logging system 20 may be distributed among the computers 11(n) and 12. In addition, the repository 23 may be maintained on a single computer 11(n) or 12. Alternatively, the repository 23 may be in the form of a distributed database maintained on a plurality of computers, in which case certain of the logging threads 22(n) may also be maintained on the respective computers and assigned respective requests based on the portion of the repository 23 to which they relate.

In addition, it will be appreciated that, instead of having each logging threads 22(n) handling particular types of requests, and having the log server main thread 21 allocate requests to the work queues 24(n) based on the particular type of request, it will be appreciated that each of the logging threads 22(n) may be able to handle all types of requests. In that case, only one work queue and one response queue need be provided, and the log server main thread 21 will load all requests into the single work queue. Each of the logging threads 21(n), when it is free to handle a request, will retrieve a request from the single work queue, process it and load a response in a single response queue.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

In addition, although various components have been described as comprising threads, it will be appreciated that they may be implemented using processes or any combination of threads and processes.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A network management information logging system for use in connection with logging management information for a network, the network management information logging system comprising:

A. a repository configured to store network information;

B. a work queue configured to receive logging requests;

C. a plurality of logging components each having direct access to said repository and configured to retrieve logging requests from said work queue, process the retrieved logging requests by directly accessing said repository in connection with logging information, and to generate logging responses responsive thereto; and D. a log server main component configured to receive logging requests from said network and loading them into said work queue, and for receiving said logging responses from said logging components and transferring them to said network.

2. A network management information logging system for use in connection with logging management information for a network, the network management information logging system comprising:

A. a repository configured to store network information;

B. a work queue configured to receive logging requests;

C. a plurality of logging components each configured to retrieve logging requests from said work queue, process the retrieved logging requests in connection with logging information in said repository, and to generate logging responses responsive thereto, at least one of said logging components being in the form of a thread; and D. a log server main component configured to receive logging requests from said network and loading them into said work queue, and for receiving said logging responses from said logging components and transferring them to said network.

3. A network management information logging system for use in connection with logging management information for a network, the network management information logging system comprising:

A. a repository configured to store network information;

B. a work queue configured to receive logging requests;

C. a plurality of logging components each configured to retrieve logging requests from said work queue, process the retrieved logging requests in connection with logging information in said repository, and to generate logging responses responsive thereto; and D. a log server main component configured to receive logging requests from said network and loading them into said work queue, and for receiving said logging responses from said logging components and transferring them to said network, the log server main component being in the form of a thread.

4. A network management information logging system as defined in claim 1 in which:

A. each of said logging components is configured to process logging requests of a predetermined logging request type, B. the network management information logging system comprises a plurality of work queues each associated with a respective logging request type, C. the log server main component is configured to load each logging request into the work queue associated with the work queue associated with the respective logging request's logging request type, and D. each logging component is configured to retrieve logging requests from the one of the work queues associated with the logging request type which the respective logging component is configured to process.

5. A network management information logging system as defined in claim 1 in which at least one logging request is a storage request, one of said logging components which processed the at least one logging request being configured to store management information in the repository.

6. A network management information logging system as defined in claim 5 in which the one of said logging components further generates said response in the form of storage status information.

7. A network management information logging system as defined in claim 1 in which at least one logging request is a retrieval request, one of said logging components which processed the at least one logging request being configured to retrieve management information from the repository for provision in the response.

8. A network management information logging method for a network, the network management information logging method comprising:

A. providing a repository configured to store network information;

B. providing a work queue for receiving logging requests;

C. providing a plurality of logging components each having direct access to said repository and configured to retrieve logging requests from said work queue, process the retrieved logging requests by directly accessing said repository in connection with logging information, and to generate logging responses responsive thereto; and D. providing a log server main component configured to receive logging requests from said network and loading them into said work queue, and for receiving said logging responses from said logging components and transferring them to said network.

9. A network management information logging method for a network, the network management information logging method comprising:

A. providing a repository configured to store network information;

B. providing a work queue for receiving logging requests;

C. providing a plurality of logging components each configured to retrieve logging requests from said work queue, process the retrieved logging requests in connection with logging information in said repository, and to generate logging responses responsive thereto, at least one of said logging components being in the form of a thread; and D. providing a log server main component configured to receive logging requests from said network and loading them into said work queue, and for receiving said logging responses from said logging components and transferring them to said network.

10. A network management information logging method for a network, the network management information logging method comprising:

A. providing a repository configured to store network information;

B. providing a work queue for receiving logging requests;

C. providing a plurality of logging components each configured to retrieve logging requests from said work queue, process the retrieved logging requests in connection with logging information in said repository, and to generate logging responses responsive thereto; and D. providing a log server main component configured to receive logging requests from said network and loading them into said work queue, and for receiving said logging responses from said logging components and transferring them to said network, the log server main component being in the form of a thread.

11. A network management information logging method as defined in claim 8 in which:

A. the logging components providing step includes the step of providing each of said logging components configured to process logging requests of a predetermined logging request type, B. the work queue providing step includes the step of providing a plurality of work queues each associated with a respective logging request type, C. the log server main component providing step includes the step of providing the log server main component configured to load each logging request into the work queue associated with the work queue associated with the respective logging request's logging request type, and D. the logging component providing step includes the step of providing each logging component configured to retrieve logging requests from the one of the work queues associated with the logging request type which the respective logging component is configured to process.

12. A network management information logging method as defined in claim 8 in which at least one logging request is a storage request, the logging component providing step including the step of providing one of said logging components for processing the at least one logging request being configured to store management information in the repository.

13. A network management information logging method as defined in claim 12 in which the one of said logging components further generates said response in the form of storage status information.

14. A network management information logging method as defined in claim 8 in which at least one logging request is a retrieval request, the logging component providing step including the step of providing one of said logging components for processing the at least one logging request being configured to retrieve management information from the repository for provision in the response.

15. A computer program product for use in connection with a computer to provide a network management information logging system for logging management information for a network, the computer program product comprising a computer readable medium having encoded thereon:

A. a repository module configured to store network information;

B. a work queue module configured to receive logging requests;

C. a logging component module configured to enable said computer to provide a plurality of logging components each having direct access to said repository and configured to retrieve logging requests from said work queue, process the retrieved logging requests by directly accessing said repository in connection with logging information, and to generate logging responses responsive thereto; and D. a log server main component module configured to enable computer to receive logging requests from said network and loading them into said work queue, and for receiving said logging responses from said logging components and transferring them to said network.

16. A computer program product for use in connection with a computer to provide a network management information logging system for logging management information for a network, the computer program product comprising a computer readable medium having encoded thereon:

A. a repository module configured to store network information;

B. a work queue module configured to receive logging requests;

C. a logging component module configured to enable said computer to provide a plurality of logging components each configured to retrieve logging requests from said work queue, process the retrieved logging requests in connection with logging information in said repository, and to generate logging responses responsive thereto, at least one of the logging components being in the form of a thread; and D. a log server main component module configured to enable computer to receive logging requests from said network and loading them into said work queue, and for receiving said logging responses from said logging components and transferring them to said network.

17. A computer program product for use in connection with a computer to provide a network management information logging system for logging management information for a network, the computer program product comprising a computer readable medium having encoded thereon:

A. a repository module configured to store network information;

B. a work queue module configured to receive logging requests;

C. a logging component module configured to enable said computer to provide a plurality of logging components each configured to retrieve logging requests from said work queue, process the retrieved logging requests in connection with logging information in said repository, and to generate logging responses responsive thereto; and D. a log server main component module configured to enable computer to receive logging requests from said network and loading them into said work queue, and for receiving said logging responses from said logging components and transferring them to said network, the log server main component being in the form of a thread.

18. A computer program product as defined in claim 15 in which:

A. each of said logging components is configured to process logging requests of a predetermined logging request type, B. the network management information logging system comprises a plurality of work queues each associated with a respective logging request type, C. the log server main component is configured to load each logging request into the work queue associated with the work queue associated with the respective logging request's logging request type, and D. each logging component is configured to retrieve logging requests from the one of the work queues associated with the logging request type which the respective logging component is configured to process.

19. A computer program product as defined in claim 15 in which at least one logging request is a storage request, one of said logging components which processed the at least one logging request being configured to store management information in the repository.

20. A computer program product as defined in claim 19 in which the one of said logging components further generates said response in the form of storage status information.

21. A computer program product as defined in claim 15 in which at least one logging request is a retrieval request, one of said logging components which processed the at least one logging request being configured to retrieve management information from the repository for provision in the response.

22. A network management information logging system as defined in claim 1, wherein the network information includes information regarding occurrence of events in the network.

23. A network management information logging system method as defined in claim 8, wherein the network information includes information regarding occurrence of events in the network.

24. A computer program product as defined in claim 15, wherein the network information includes information regarding occurrence of events in the network.

* * * * *